(12) United States Patent
Mingle et al.

(10) Patent No.: US 8,444,057 B2
(45) Date of Patent: May 21, 2013

(54) SECURITY LABELS WITH REINFORCED WINDOWS AND METHODS OF MAKING THE SAME

(75) Inventors: Jack Mingle, Sicklerville, NJ (US); Gary Mazoki, Sewell, NJ (US); Anthony F. Piccoli, West Deptford, NJ (US)

(73) Assignee: Checkpoint Systems, Inc., Thorofare, NJ (US)

( * ) Notice: Subject to any disclaimer, the term of this patent is extended or adjusted under 35 U.S.C. 154(b) by 309 days.

(21) Appl. No.: 12/778,560

(22) Filed: May 12, 2010

(65) Prior Publication Data

US 2011/0024509 A1  Feb. 3, 2011

Related U.S. Application Data

(60) Provisional application No. 61/229,592, filed on Jul. 29, 2009.

(51) Int. Cl.
*G06K 19/02* (2006.01)
(52) U.S. Cl.
USPC .......................... 235/488; 235/487
(58) Field of Classification Search
USPC ................................ 235/488, 487
See application file for complete search history.

(56) References Cited

U.S. PATENT DOCUMENTS

| 5,708,419 | A | 1/1998 | Isaacson et al. |
| 7,129,843 | B2 | 10/2006 | Piccoli et al. |
| 7,278,580 | B2 * | 10/2007 | Jones et al. ................... 235/488 |
| 7,900,843 | B2 * | 3/2011 | Tanner et al. ................. 235/492 |
| 2007/0090955 | A1 | 4/2007 | Cote et al. |
| 2008/0150719 | A1 | 6/2008 | Cote et al. |
| 2008/0191883 | A1 | 8/2008 | Imaichi et al. |

OTHER PUBLICATIONS

International Search Report for corresponding PCT Application No. PCT/US2010/043566, dated Sep. 30, 2009.

* cited by examiner

*Primary Examiner* — Karl D Frech
(74) *Attorney, Agent, or Firm* — Caesar, Rivise, Bernstein, Cohen & Pokotilow, Ltd.

(57) ABSTRACT

Security labels and tags including elements and methods of making them are disclosed. The elements are in the form of an oriented polymer layer, conductive traces clad to the polymer layer to form an open loop forming a window in the interior of the loop and an open support framework extending into the window to support the polymer layer in the window. In some embodiments the open support framework is in the form of parallel, interleaved linear extensions from the conductive traces which extend into the window. In other embodiments the open support framework is in a pattern of intersecting sections (e.g., a fishbone pattern) located in the window.

33 Claims, 3 Drawing Sheets

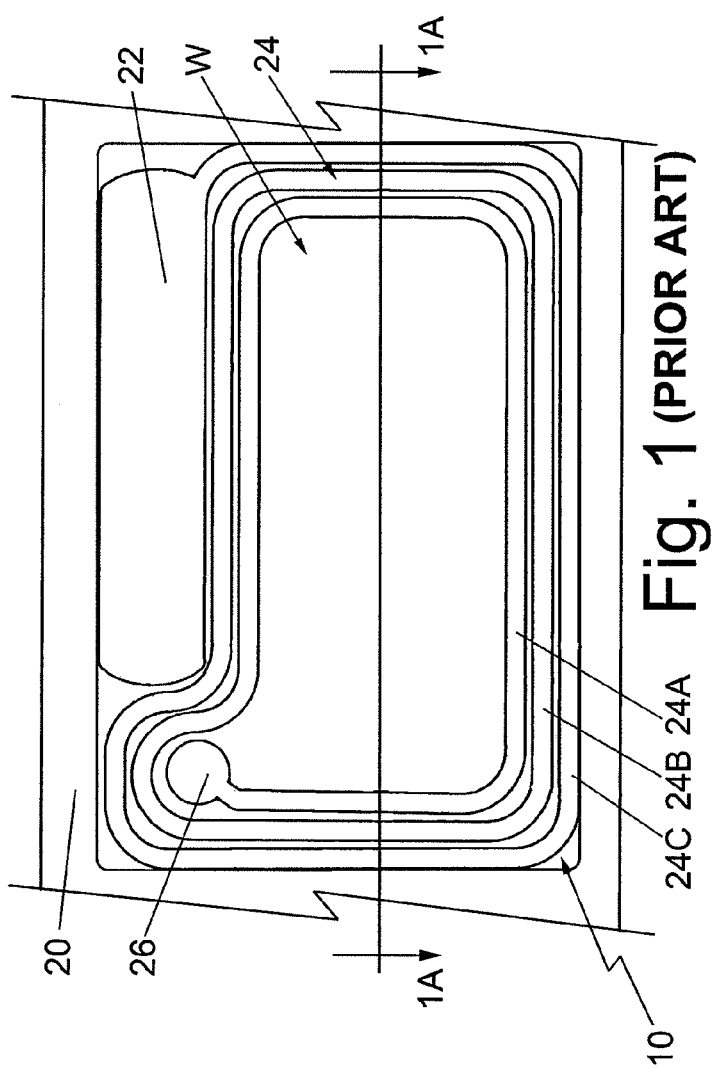
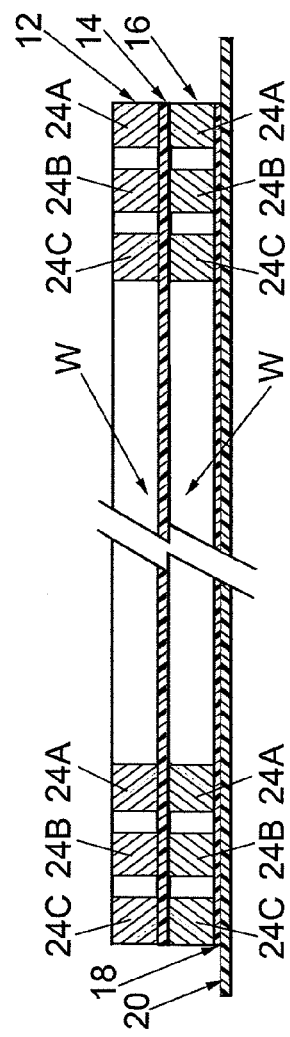
Fig. 1 (PRIOR ART)
Fig. 1A (PRIOR ART)

SECURITY LABELS WITH REINFORCED WINDOWS AND METHODS OF MAKING THE SAME

CROSS-REFERENCE TO RELATED APPLICATIONS

This application claims priority from U.S. Provisional Application Ser. No. 61/229,592, filed on Jul. 29, 2009, entitled Reinforced Window For An Oriented Polypropylene Security Label, whose disclosure is incorporated by reference herein.

STATEMENT REGARDING FEDERALLY SPONSORED RESEARCH OR DEVELOPMENT

"Not Applicable"

INCORPORATION-BY-REFERENCE OF MATERIAL SUBMITTED ON A COMPACT DISK

"Not Applicable"

FIELD OF THE INVENTION

This invention relates to generally to electronic article surveillance and particularly to a disposable security label or tag including an element responsive to electromagnetic stimulation.

BACKGROUND OF THE INVENTION

United States Patent Application 2008/0191883 A1 (Imaichi, et al.) describes a resonant tag for use with a radio-wave detection system for the prevention of shoplifting or the like which has a coil and capacitor circuit formed on opposite sides of an extremely thin substrate of a biaxially-oriented polypropylene, with one of the capacitor plates formed on one side of the substrate and the coil and other capacitor plate formed on the other side of the substrate, and whereby the circuit can provide the same performance of a conventional resonant tag but using a much smaller size.

U.S. Pat. No. 7,129,843 (Piccoli, et al.) describes a security tag that includes a combination of a resonant frequency circuit with an adjacent amplification shield for enhancing output signal amplitude. The amplification shield is located adjacent to the resonant frequency circuit and is preferably in the same or substantially the same plane as the resonant frequency circuit or is in a close, generally parallel plane. In an exemplary embodiment, the resonant frequency circuit includes an inductor electrically coupled to a capacitor. The resonant frequency circuit has a center frequency and is arranged to resonate in response to exposure to electromagnetic energy at or near the center frequency, providing an output signal having an amplitude. The amplification shield is arranged to direct a portion of the electromagnetic energy to the resonant frequency circuit to amplify the amplitude of the output signal from the resonant frequency circuit.

Notably, FIG. 2 of the Piccoli et al. patent depicts conductive traces in the interior of the loop. Among these traces are multiple dots. These are electrically inert at the resonant frequency of the tag depicted. Presumably their only purpose is to reduce the amount of chemicals required to achieve the desired pattern when the pattern is created by etching a solid sheet of metal or other conductor. Also depicted is a "trimmable" segment of capacitor tuning "fingers." The exact resonant frequency of the circuit can be adjusted by cutting or ablating this structure at a selected location.

U.S. Patent Application Publication No. 2008/0150719 (Cote, et al.) describes a combination EAS and UHF security tag that adds the ability to add item level UHF functionality to a retail tag and maintain the integrity of the EAS systems installed in the business and whereby the EAS and UHF security elements are substantially formed from a common conductive layer. This combination tag also includes the ability to change a tag for use as a "far-field read" tag to use as a "near-field read" tag. U.S. Patent Application Publication No. 2007/0090955 (Cote, et al.) describes a capacitor strap that is applied to a security tag coil or antenna to form and properly tune an EAS or an RFID security tag. The capacitor strap is a thin film capacitor formed of two metal foils, in between which is a dielectric material having ends that are electrically coupled to different points of a security tag coil or antenna. The capacitor strap may include an RFID integrated circuit, either in series or in parallel with the capacitor, which is then applied to security tag coil at a particular location to tune the tag to a predetermined frequency.

While the inventions of the above identified prior art patents appear suitable for their intended purposes, they leave something to be desired from the standpoint of addressing certain process stability and yield concerns, which arise while attempting to make new resonant or combination resonant/UHF security label element circuits with large window areas using newer oriented polymer base materials. In particular, the thinness of the oriented polymer substrate, combined with the use of newer adhesives to clad aluminum or other conductors to the substrate, can lead to undesired process variation or yield fall out do to stretching, stressing, or tearing of portions of manufacturing webs subjected to heat, tension, and/or air or chemical jets.

The subject invention addresses that unmet need by providing mechanical improvements to the elements of the security label/tag. In addition, by providing mechanical improvements to the elements of the label/tag, this invention enables the label/tag to achieve superior multiple frequency response.

All references are incorporated in their entirety.

SUMMARY OF THE INVENTION

In accordance with one aspect of the invention there is provided a security label/tag element comprising an oriented polymer layer (e.g., biaxially-oriented polypropylene), conductive traces clad to the polymer layer in the form of an open loop and defining a window in the interior of the open loop, and an open support framework extending into a portion of the window to support the polymer layer in the window.

In accordance with one exemplary aspect of this invention the open support framework comprises a least one contiguous extension of the conductive traces (e.g., a plurality elongated segments disposed generally parallel to each other, with at least one of the plural elongated segments extending from a first portion of the loop and with at least another of the plural elongated segments extending from a second portion of the loop, the second portion of the loop being located opposite the first portion of the loop, and with the plural elongated segments being interleaved with each other).

In accordance with another exemplary aspect of this invention the open support framework comprises a plurality of intersecting sections (e.g., a fishbone pattern).

In accordance with still another aspect of this invention methods of producing a security label/tag element are provided. The methods comprise providing a layer of an oriented polymer layer (e.g., biaxially-oriented polypropylene), applying conductive traces to the polymer layer in the form of an open loop defining a window in the interior of the open loop (e.g., the open loop having two ends with a capacitor coupled to the two ends, with the loop and the capacitor forming a resonant circuit and with the capacitor being formed by an overlap of conductive traces on opposed sides of the polymer layer) and applying an open support framework to the polymer layer, with the open support framework extending into a portion of the window to support the polymer layer in the window.

In accordance with another exemplary aspect of this invention the open support framework applied to the polymer layer by the method comprises a least one contiguous extension of the conductive traces (e.g., a plurality elongated segments disposed generally parallel to each other, with at least one of the plural elongated segments extending from a first portion of the loop and with at least another of the plural elongated segments extending from a second portion of the loop, the second portion of the loop being located opposite the first portion of the loop, and with the plural elongated segments being interleaved with each other).

In accordance with another exemplary aspect of this invention the open support framework applied to the polymer layer by the method comprises a plurality of intersecting sections (e.g., a fishbone pattern).

DESCRIPTION OF THE DRAWING

FIG. 1 is a plan view of an exemplary prior art security lable/tag;

FIG. 1A is an enlarged cross-sectional view of taken along line 1A-1A of FIG. 1;

DETAILED DESCRIPTION OF THE PREFERRED EMBODIMENT

Figure 2:
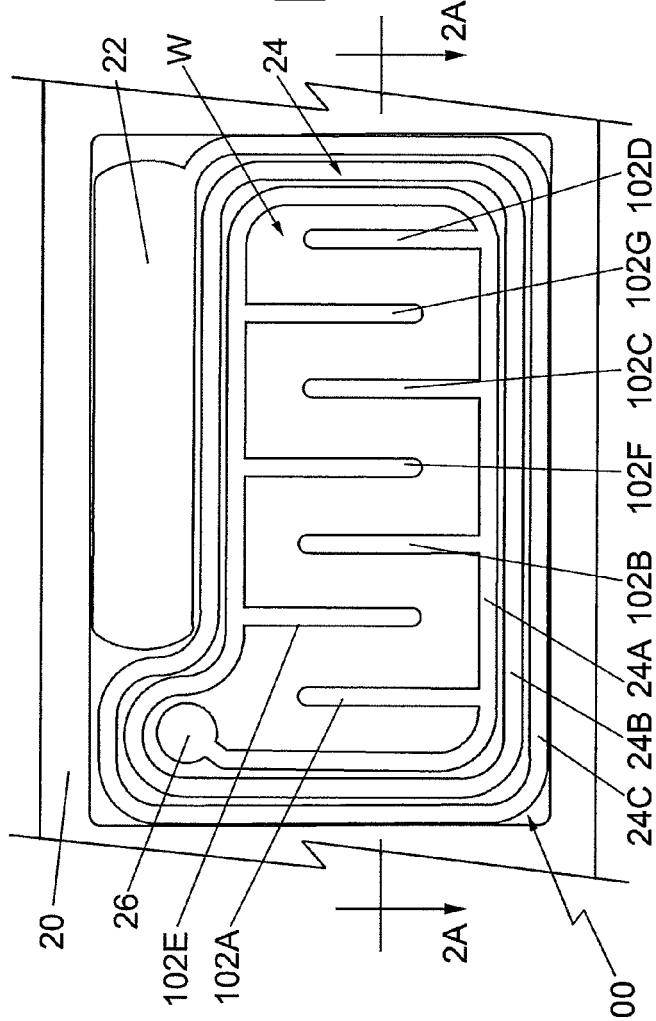
FIG. 2 is a plan view of one exemplary embodiment of a security label/tag constructed in accordance with this invention.

Referring now to the various figures of the drawing wherein like reference characters refer to like parts, there is shown in FIGS. 1 and 1A an exemplary security label or tag 10 constructed in accordance with the prior art. That tag 10 basically comprises a first layer in the form of a conductive pattern or trace 12, an interposed dielectric layer 14, and a second layer in the form of a conductive pattern or trace 16. The label/tag is releasably secured via an adhesive 18 onto a release liner or carrier web 20. In the exemplary embodiment shown the conductive pattern 12 is in the form of a loop 24 spiraling inwardly in a clockwise fashion, forming an inductor coil of nearly three turns 24A, 24B and 24C. The inner end of turn 24A is in the form of an enlarged (e.g., circular) weld spot or termination 26. The outer end of the turn 24C is in the form of an elongated capacitor plate 22. The conductive pattern 16 is constructed similarly to the pattern 12, i.e., includes a loop coiled into three turns corresponding to loop 24 and a capacitor plate corresponding substantially to capacitor plate 22 of layer 12. The construction of layer 16 to be similar to layer 12 is merely on example of various arrangements possible in accordance with this invention. Thus, for example, the layer 16 may be constructed so that it doesn't include any loop, but only includes a capacitor plate 22 and a weld spot or termination 26. In any case, the layers 12 and 16 may be directly affixed to the respective sides of the dielectric layer 14 or may be secured thereto via an adhesive (e.g., a styrene-based or olefin-based adhesive). The central area or window W within the bounds of the inner turns 24A of the layers 12 and 16 is unsupported, i.e., consists of only the dielectric layer 14 located therein.

The capacitor plate 22 of the conductive layer 16 includes a lead or tail in the form of an enlarged (e.g., circular) weld spot or location (not shown) that is axially aligned with the weld location 26 of the conductive layer 12. Connecting the two layers at the weld locations 26 completes the inductor-capacitor resonant circuit of the label/tag 10. In particular, the resonant circuit of the label/tag is completed by electrically connecting, e.g., welding, the weld spots 26 of the two layers 12 and 16 together through the dielectric layer 14. Alternatively, a capacitor strap (not shown) can be added to the conductive layer 12 between the capacitor plate 22 and the weld spot 26. In such an arrangement the layers 12 and 16 need not include the capacitor plates 22. The dielectric layer 14 may comprise a variety of materials such as polyester or polypropylene and is very thin, e.g., 5 μm or less. If the dielectric layer 14 is an oriented polymer, by way of example only, the direction of web travel in making the label/tag 10 is significant. Normally such security label elements are fabricated in reel-to-reel manufacturing lines in which the pattern of the conductive layers are repeated in an array along a long tape, or web, of materials in process. In addition to heat, tension traverse to the web, and/or air or chemical jets blowing perpendicular to the plane of the web, the processing equipment can subject the web to significant stresses along the web travel axis. Thus, since the large central area or window W within the bounds of the inner turns 24C of the conductive layers 12 and 14 is empty, the portion of the dielectric layer 14 located in that window is susceptible to damage.

Tags constructed in accordance with this invention overcome that potential problem. To that end, in FIGS. 2 and 2A and FIGS. 3 and 3A there are shown two exemplary embodiments of tags or labels 100 and 200, respectively, constructed in accordance with this invention. The tags 100 and 200 include an open support framework made up of additional conductive elements or traces (to be described later) extending into the tag's window W. These additional elements provide mechanical strength to the tag, while also enabling the tag to exhibit superior multiple frequency response.

Figure 2A:
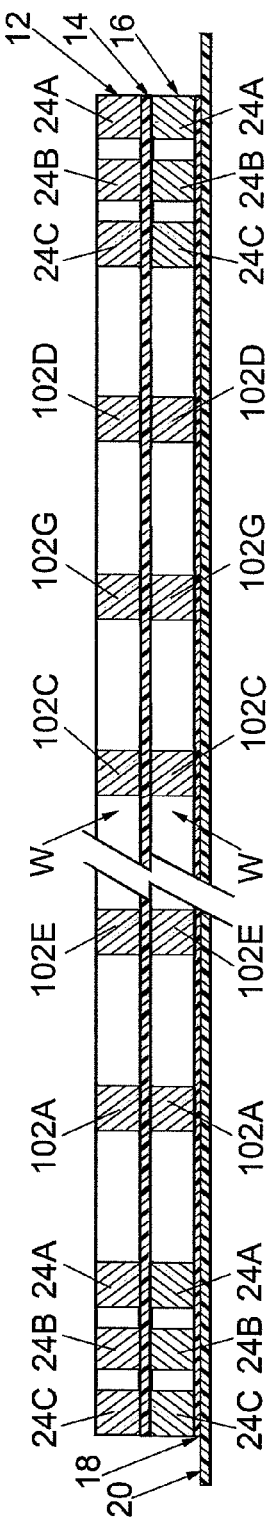
FIG. 2A is an enlarged cross-sectional view of taken along line 2A-2A of FIG. 2.

Turning now to FIGS. 2 and 2A, the tag 100 will now be described. As can be seen the tag 100 is similar in many respects to tag 10. To that end, those components of tag 100 which are the same as those of tag 10 will be given the same reference numbers and the details of their construction and arrangement will not be reiterated in the interest of brevity. In the exemplary embodiment of tag 100, the open support framework is in the form of at least one extension and preferably plural extensions inter-digitated extensions or "icicles" 102A, 102B, 102C, 102D, 102E, 102F and 102G. Each of the extensions or elements is a linear trace in the range of approximately 10-30 mm in length for a typical tag of 85 mm by 55 mm size. The elements 102A, 102B, 102C and 102D are disposed parallel to one another and project inward into the central window W from the bottom of the inner loop 24. The elements 102E, 102F, and 102G are disposed parallel to one another and project inward into the central window W from the top of the inner loop 24 and are interleaved between the elements 102A, 102B, 102C and 102D.

Thus, the "icicles" emanate from both sides of the inner loop 24A and are interleaved to form an open support framework for supporting and reinforcing the contiguous portions of the dielectric layer making up the window W.

It must be point out at this juncture that the subject invention is not limited to the exemplary embodiment shown in FIGS. 2 and 2A. However, that peculiar construction does provide some significant advantages that will be readily appreciated by those skilled in the art from the discussion to follow. In this regard, it is critical that the open framework, e.g., the extensions, create neither a closed loop nor a new resonance in the near the frequency of interest, i.e., near the desired resonant frequency of the security tag/label. The open framework does, however, provide a complex passive resonance signature by the arrangement of its multiple extensions. That complex passive resonance signature can be made to comprises a first peak response from the loop and capacitor in the range of 1 to 20 MHz and a second peak response from the arrangement of multiple extensions within a band selected from the list including 40 to 70 MHz, 850 to 950 MHz, 2.4 to 2.6 GHz, or 6 to 7 GHz.

The extensions 102A-102G have been shown experimentally to have no effect on the performance of the security circuit element. The use of longer extensions, as opposed to shorter extensions (or the small dots as seen in the prior art), reduces the chances of delamination of these conductive traces, thus increasing process yield and minimizing the chance of introducing conductive fragment contaminants to the product line. Similarly, anchoring the extensions to the inner turn of the loop helps to prevent delamination.

Further, the conductive traces may be much stronger than the oriented polymer of the dielectric layer 14 on which they rest. For example, the dielectric layer 14 may be a flexible biaxially oriented polypropylene (BOPP) sheet less then 5 μm thick, while the conductive layer 12 or 14 (e.g., aluminum) is 80 μm thick. This leads to greater resistance and stability when the web is subjected to stresses in any direction. Of particular advantage is resistance against "blowout," whereby air, water, or chemical jets might otherwise cause ruptures in larger unsupported areas of dielectric that contain damage or small flaws. A similar advantage is greater dimensional stability, particularly in the direction of web travel, resulting in tighter frequency distributions of finished webs of security label elements.

Figure 3:
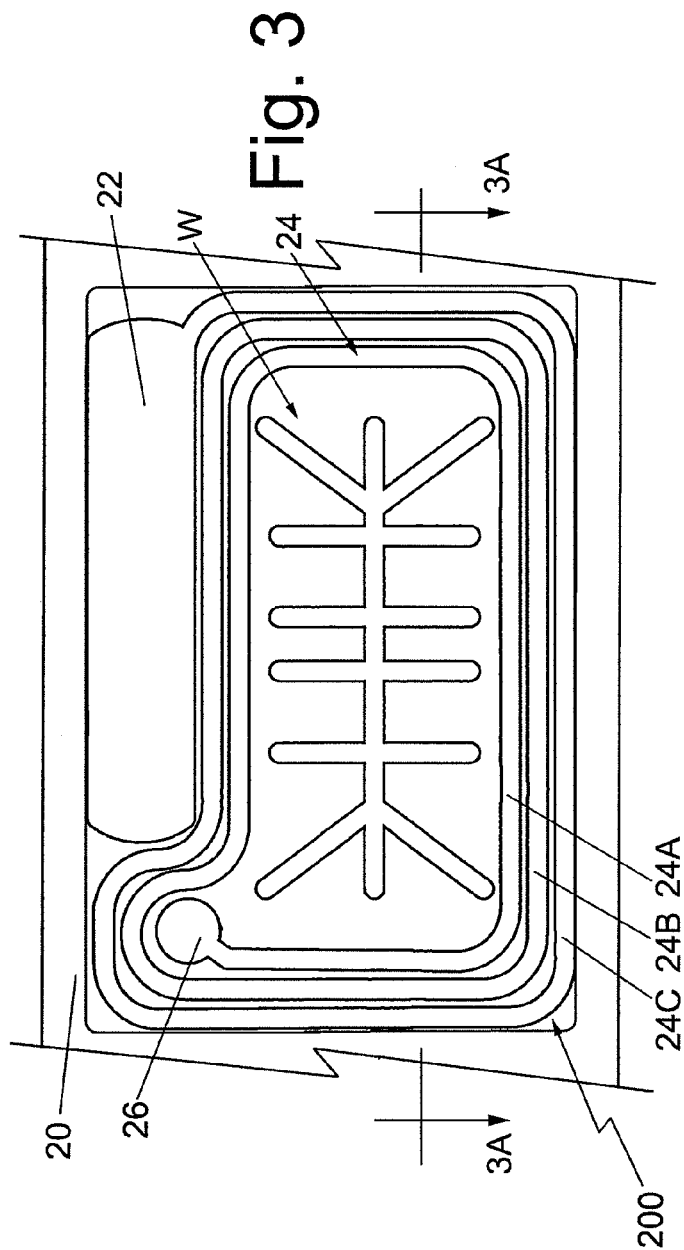
FIG. 3 is a plan view of another exemplary embodiment of a security label/tag constructed in accordance with this invention.
Figure 3A:
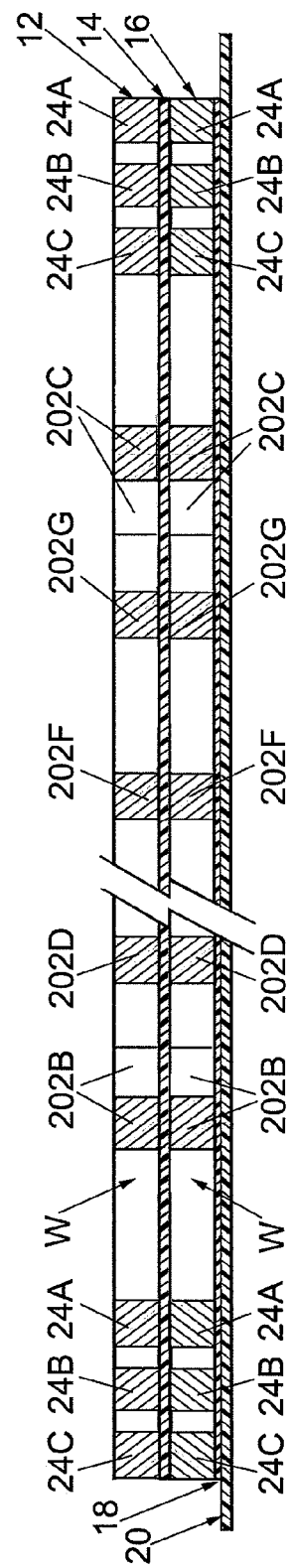
FIG. 3A is an enlarged cross-sectional view of taken along line 3A-3A of FIG. 3.

Turning now to FIGS. 3 and 3A, the label/tag 200 will now be described. As can be seen the tag 200 is similar in many respects to labels/tags 10 and 100. To that end, those components of tag 200 which are the same as those of tags 10 and 100 will be given the same reference numbers and the details of their construction and arrangement will not be reiterated in the interest of brevity. In the exemplary embodiment of tag 200, the open support framework is in the form of additional elements forming a fishbone-like pattern or structure (to be described hereinafter) of conductive material located in the window of the inner loop 24A. In particular, the fishbone structure is a conductive trace comprising a central linear conductive element 202A, a first chevron or V-shaped conductive element 202B located adjacent one end of the element 202A, a second chevron or V-shaped conductive element 202C located adjacent the opposite end of the element 202A, and four linear elements 202D, 202E, 202F and 202G extending transversely to the element 202A.

As will be appreciated by those skilled in the art elements 202A-202G making up the fishbone pattern trace form neither a closed loop, nor a structure resonating near the frequency of interest. It is worth nothing that to varying degrees, any similar structures, such as plural unconnected fishbone structures or hash patterns would also be effective. However, the greatest dimensional stability and resistance to delamination are expected from either the single "fishbone" example as illustrated in FIGS. 3 and 3A, or an "icicle" pattern as shown in FIGS. 2 and 2A. Like the interdigitated embodiment of FIGS. 2 and 2A, the fishbone embodiment of FIGS. 3 and 3A can be designed to provide a complex passive resonance signature comprising a first peak response from the loop and capacitor in the range of 1 to 20 MHz and a second peak response from the arrangement of multiple extensions within a band selected from the list including 40 to 70 MHz, 850 to 950 MHz, 2.4 to 2.6 GHz, or 6 to 7 GHz.

Thus, where open support frameworks, such as the interdigitated (interleaved) or fishbone pattern elements, are used these structures can be arranged so as to provide a peculiar passive frequency response separate from that of the loop/capacitor circuit, and thus useful in identifying the security label element to an electromagnetic interrogator of that second band. For example, the icicles, while essentially inert in the range of 1 to 20 MHz, may provide dipole or other resonating antenna or waveguide elements at higher frequencies in the UHF or microwave ISM bands that are useful for RFID. An integrated circuit could enhance this response of the tag as well. For example, if the loop and capacitor of the tag were used as a resonating system for a 13.56 MHz RFID chip, the icicles used to reinforce the interior of the loop could be combined with a separate diode integrated circuit to provide signature in the 2.5 GHz range.

It should also be noted that optionally, the security labels/tags of this invention can be completed by placing an integrated circuit in series with, or parallel to, the capacitor. The integrated circuit may take the form of an RFID circuit (not shown), a fuse (not shown), or a diode (not shown), or other electronic assembly or microchip (not shown). The security label element may be fabricated with, or later combined with, any other security or informational labeling, such as but not limited to dipole microwave RFID circuits, magnetically permeable electromagnetic responsive materials, acoustomagnetostrictive resonant elements, "invisible" security ink indicia, bar codes, care instructions, etc.

While the invention has been described in detail and with reference to specific examples thereof, it will be apparent to one skilled in the art that various changes and modifications can be made therein without departing from the spirit and scope thereof and thus others may, by applying current or future knowledge, adopt the same for use under various conditions of service.

We claim:

1. A security label element comprising:
   a) an oriented polymer layer forming a dielectric layer of said security label element;
   b) conductive traces clad to said polymer in the form of an open loop and defining a window in the interior of said open loop; and
   c) an open support framework extending into a portion of said window to support said polymer layer in said window.

2. The security label element of claim 1 wherein said open support framework comprises at least one contiguous extension of said conductive traces.

3. The security label element of claim 2 wherein said at least one continuous extension comprises plural elongated segments disposed generally parallel to each other.

4. The security label element of claim 3 wherein at least some of said plural elongated segments are interleaved with each other.

5. The security label element of claim 4 wherein at least one of said plural elongated segments extends from one portion of said loop while at least one other of said elongated segments extends from another portion of said loop, said other portion of said loop being located opposite said one portion of said loop.

6. The security label element of claim 1 wherein said oriented polymer layer is polypropylene.

7. The security label element of claim 1 wherein said open loop comprises two ends and wherein a capacitor is coupled to said two ends.

8. The security label element of claim 7 wherein said loop and said capacitor form a resonant circuit.

9. The security label element of claim 7 wherein said capacitor is formed by an overlap of conductive traces on opposed sides of said polymer layer.

10. The security label element of claim 7 wherein said capacitor is a capacitor strap.

11. The security label element of claim 7 wherein said open framework comprises multiple extensions and wherein said security element is adapted to provide a complex passive resonance signature by the arrangement of said multiple extensions, the complex passive resonance signature comprising:
   a first peak response from the loop and capacitor in the tango, of 1 to 20 MHz; and
   b) a second peak response from the arrangement of multiple extensions within a band selected from the list including 40 to 70 MHz, 850 to 950 MHz, 2.4 to 2.6 GHz, or 6 to 7 GHz.

12. The security label element of claim 1 wherein said open support framework comprises a plurality of intersecting sections.

13. The security label element of claim 7 wherein said open framework comprises a plurality of intersecting sections and wherein said security element is adapted to provide a complex passive resonance signature by the arrangement of said sections, the complex passive resonance signature comprising:
   a first peak response from the loop and capacitor in the range of 1 to 20 MHz and
   b) a second peak response from the arrangement of multiple extensions within a band selected from the list including 40 to 70 MHz, 850 to 950 MHz, 2.4 to 2.6 GHz, or 6 to 7 GHz.

14. The security label element of claim 1 further comprising an integrated circuit coupled to said conductive traces.

15. The security label element of claim 14 wherein said integrated circuit comprises an RFID circuit.

16. The security label element of claim 14 wherein said integrated circuit comprises a fuse.

17. The security label element of claim 14 wherein said integrated circuit comprises a diode.

18. The security label element of claim 1 wherein said conductive traces are clad to said polymer layer to form a dipole antenna.

19. The security label element of claim 1 further comprising an adhesive layer and a releasable liner positioned over said adhesive layer.

20. The security label element of claim 12 wherein said pattern comprises a fishbone pattern.

21. A method of producing a security label element comprising:
   a) providing a layer of an oriented polymer layer;
   b) applying conductive traces to said polymer layer in the form of an open loop defining a window in the interior of said open loop; and
   c) applying an open support framework to said polymer layer, said open support framework extending into a portion of said window to support said polymer layer in said window.

22. The method of claim 21 wherein said open framework comprises a plurality of intersecting sections.

23. The method of claim 21 wherein said oriented polymer layer is polypropylene.

24. The method of claim 21 wherein said open loop comprises two ends and wherein said method additionally comprises coupling a capacitor to said two ends.

25. The method of claim 24 wherein said open loop and said capacitor form a resonant circuit.

26. The method of claim 24 wherein said capacitor is formed by an overlap of conductive traces on opposed sides of said polymer layer.

27. The method of claim 24 wherein said capacitor is a capacitor strap.

28. The method of claim 21 further comprising coupling an integrated circuit to said conductive traces.

29. The method of claim 28 wherein said integrated circuit comprises an RFID circuit.

30. The method of claim 28 wherein said integrated circuit comprises a fuse.

31. The method of claim 28 wherein said integrated circuit comprises a diode.

32. The method of claim 21 wherein said conductive traces are clad to said polymer layer to form a dipole antenna.

33. The method of claim 21 wherein said security label element is disposed on a releasable liner and releaseably secured thereto by an adhesive.

* * * * *

UNITED STATES PATENT AND TRADEMARK OFFICE
CERTIFICATE OF CORRECTION

| | | |
|---|---|---|
| PATENT NO. | : 8,444,057 B2 | Page 1 of 1 |
| APPLICATION NO. | : 12/778560 | |
| DATED | : May 21, 2013 | |
| INVENTOR(S) | : Mingle et al. | |

It is certified that error appears in the above-identified patent and that said Letters Patent is hereby corrected as shown below:

In the Specification:

In the Field of Invention, col. 1, line 27, "This invention relates to generally to . . ." should be changed to "This invention relates generally to . . .".

In the Description of the Drawing, col. 3, line 30, the Figure 1 description reading as "lable" should read as "label".

In the Description of the Drawing, col. 3, line 36, to the Figure 2A description, the phrase reading "view of taken" should read as "view of the one exemplary embodiment taken".

In the Description of the Drawing, col. 3, line 41, to the Figure 3A description, the phrase reading "view of taken" should read as "view of the another exemplary embodiment taken".

In the Claims:

Col. 7, line 21, the phrase "security element" should be changed to "security label element".

Col. 7, line 25, it should read "a) a first peak . . .".

Col. 7, line 26, "tango," should be changed to "range".

Col. 7, line 39, it should read "a) a first peak . . .".

Col. 8, line 11, the phrase "said pattern" should be changed to "said framework".

Signed and Sealed this
Seventeenth Day of September, 2013

Teresa Stanek Rea
*Deputy Director of the United States Patent and Trademark Office*